US012281395B2

United States Patent
Zhang et al.

(10) Patent No.: US 12,281,395 B2
(45) Date of Patent: Apr. 22, 2025

(54) PROCESSING DEVICE AND WORKING METHOD FOR FILM COOLING HOLES ON BLADE OF AVIATION ENGINE

(71) Applicant: QINGDAO UNIVERSITY OF TECHNOLOGY, Shandong (CN)

(72) Inventors: Fengyun Zhang, Shandong (CN); Shufeng Sun, Shandong (CN); Qiang Zhang, Shandong (CN); Pingping Wang, Shandong (CN); Jing Shao, Shandong (CN); Dexiang Wang, Shandong (CN); Qingyu Liu, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 750 days.

(21) Appl. No.: 17/606,052

(22) PCT Filed: Nov. 22, 2019

(86) PCT No.: PCT/CN2019/120392
§ 371 (c)(1),
(2) Date: Oct. 25, 2021

(87) PCT Pub. No.: WO2020/215716
PCT Pub. Date: Oct. 29, 2020

(65) Prior Publication Data
US 2022/0195608 A1    Jun. 23, 2022

(30) Foreign Application Priority Data

Apr. 25, 2019  (CN) .......................... 201910340822.7

(51) Int. Cl.
C23F 1/08       (2006.01)
B23K 26/08      (2014.01)
(Continued)

(52) U.S. Cl.
CPC .............. C23F 1/08 (2013.01); B23K 26/082 (2015.10); B23K 26/0823 (2013.01);
(Continued)

(58) Field of Classification Search
None
See application file for complete search history.

(56) References Cited

FOREIGN PATENT DOCUMENTS

CN   H09144504       6/1997
CN   101613861       12/2009
(Continued)

OTHER PUBLICATIONS

"International Search Report (Form PCT/ISA/210) of PCT/CN2019/120392," mailed on Feb. 26, 2020 with English translation thereof, pp. 1-8.
(Continued)

Primary Examiner — Geoffrey S Evans
(74) Attorney, Agent, or Firm — JCIP GLOBAL INC.

(57) ABSTRACT

A processing device for film cooling holes on blade of aviation engine includes a working box. A workpiece clamping mechanism is arranged in the working box for holding the workpiece. A cover body having an internal space communicated with an internal space of the working box is connected to an upper part of the working box. A laser processing mechanism is connected to a top end of the cover body and can produce laser rays to carry out laser processing on the workpiece. The cover body is connected to a liquid supply mechanism and an acid gas filtration mechanism. The liquid supply mechanism can spray an acidic solution to the workpiece in the working box, and the working box can collect the acidic solution. The acid gas filtration mechanism can filter acid steam produced during processing. A working method of the processing device is also provided.

9 Claims, 9 Drawing Sheets

(51) Int. Cl.
  *B23K 26/082* (2014.01)
  *B23K 26/12* (2014.01)
  *B23K 26/146* (2014.01)
  *B23K 26/38* (2014.01)
  *B23K 26/382* (2014.01)
  *B23K 37/04* (2006.01)
  *C23F 1/02* (2006.01)
  *B23K 101/00* (2006.01)

(52) U.S. Cl.
  CPC .......... *B23K 26/127* (2013.01); *B23K 26/146* (2015.10); *B23K 26/389* (2015.10); *B23K 37/0435* (2013.01); *C23F 1/02* (2013.01); *B23K 2101/001* (2018.08)

(56) References Cited

FOREIGN PATENT DOCUMENTS

| | | |
|---|---|---|
| CN | 102126087 | 7/2011 |
| CN | 102901679 | 1/2013 |
| CN | 104439710 | 3/2015 |
| CN | 105458530 | 4/2016 |
| CN | 105880849 | 8/2016 |
| CN | 107813114 | 3/2018 |
| CN | 107962359 | 4/2018 |
| CN | 108211729 | 6/2018 |
| CN | 109226983 | 1/2019 |
| CN | 109483060 | 3/2019 |
| CN | 110202277 | 9/2019 |
| JP | 109144504 | 6/1997 |
| WO | WO-2013049058 A1 * | 4/2013 ........... B01D 53/505 |

OTHER PUBLICATIONS

"Written Opinion of the International Searching Authority (Form PCT/ISA/237) of PCT/CN/2019/120392," mailed on Feb. 26, 2020, with English translation thereof, pp. 1-10.
"Office Action of China Counterpart Application" with English translation thereof, issued on Jan. 16, 2020, p. 1-p. 21.
"Office Action of China Counterpart Application" with English translation thereof, issued on Jul. 3, 2020, p. 1-p. 22.
"Office Action of China Counterpart Application" with English translation thereof, issued on Oct. 23, 2020, p. 1-p. 9.
"Office Action of China Counterpart Application" with English translation thereof, issued on Feb. 4, 2021, p. 1-p. 11.

\* cited by examiner

PROCESSING DEVICE AND WORKING METHOD FOR FILM COOLING HOLES ON BLADE OF AVIATION ENGINE

CROSS-REFERENCE TO RELATED APPLICATION

This application is a 371 of international application of PCT application serial no. PCT/CN2019/120392, filed on Nov. 22, 2019 which claims the priority benefit of China application no. 201910340822.7, filed on Apr. 25, 2019. The entirety of each of the above mentioned patent applications is hereby incorporated by reference herein and made a part of this specification.

BACKGROUND

Technical Field

The present invention relates to the technical field of mechanical processing equipment, in particular it relates to a processing device and working method for film cooling holes on blade of aviation engine.

Description of Related Art

The blade of aviation engine, usually made of nickel-base alloys, are capable of working at temperatures above 700° C. and maintaining its mechanical and physical properties, especially strength and corrosion resistance, for a longer period of time. However, this kind of alloys are very difficult to process because of low thermal conductivity, high toughness, strong work hardening, high wear resistant carbide particles and a strong tendency to form edges.

Because the engine operates at such extreme temperatures, the blade must be cooled during operation. Blade can be cooled through film cooling holes. The role of the film cooling hole is to provide a cooling gas flow that can cover the profile of the blade, thereby reducing the blade operating temperature. In order to obtain good cooling efficiency, such number of holes with different angles and arrangements were machined on the blade surface. These holes, with diameters ranging from 0.2 mm to 0.8 mm, belong to the category of small holes and have complex spatial angles, and their machining quality and accuracy are the key factors affecting the performance of turbine blade and aviation engines.

At present, the processing of film cooling holes is carried out by laser drilling technology. The inventor found that in the process of laser processing, recast layer is easy to be produced in the holes, which seriously affects the processing quality of film cooling holes.

SUMMARY

The purpose of the invention is to provide a processing device for film cooling holes on blade of aviation engine to overcome the deficiencies of the prior art, which can effectively remove the recast layer generated when laser processing the film cooling holes and improve the processing quality of the film cooling holes.

To achieve the objective, the present invention includes the following technical solutions.

A processing device for film cooling holes on blade of aviation engines, includes a working box. In the working box, there is a workpiece clamping mechanism for clamping a workpiece. An upper part of the working box is connected to a cover body having an internal space in communication with an internal space of the working box. A top end of the cover body is connected to a laser processing mechanism, and the laser processing mechanism can produce a laser ray to carry out laser processing on the work piece in the working box. The cover body is connected to a liquid supply mechanism and an acid gas filtration mechanism. The liquid supply mechanism can spray the acidic solution to the work piece in the working box, and the working box can collect the acidic solution, the acid gas filtration mechanism can filter the acid steam produced during processing.

The laser processing mechanism can carry out laser drilling on the workpiece. The liquid supply mechanism can inject the acidic solution, which does not react with the workpiece at room temperature, into the working box. After drilling is completed, the laser can heat the acidic solution in a drilling area, and the acidic solution reacts with a recast layer created by the laser processing. Eventually, the recast layer is removed.

Further, the liquid supply mechanism comprises a liquid storage box for holding the acidic solution, the liquid storage box is connected to the cover through a liquid-supply pipeline, and an end of the liquid-supply pipeline is provided with a nozzle extending into the cover. A driving pump is connected to the liquid-supply pipeline, and the driving pump can drive the acidic solution in the liquid storage box to enter the working box.

Further, a mechanical arm is connected to the nozzle, which is used to adjust a position of the nozzle.

Further, a pressure stabilizing tank is further connected to the liquid-supply pipeline, which is used to maintain the output pressure of the acidic solution.

Further, a partition board is disposed in the working box and divides the working box space into liquid storage zone and liquid discharge zone. The workpiece clamping mechanism is located inside the liquid storage zone. An opening is arranged on the partition board and has a door to control communication and closure of the liquid storage zone and the liquid discharge zone. The liquid discharge zone is connected to the liquid storage box through a liquid-return pipeline, and the acidic solution in the liquid discharge zone can enter the liquid storage box through the liquid-return pipeline.

Further, the acid gas filtration mechanism comprises an acid gas filter box used for storage alkaline solution, one end of a gas-suction pipe is connected to the acid gas filter box, and the other end of the gas-suction pipe is connected to the cover body. The acidic steam in the cover body can be sucked into the acid gas filter box through the gas-suction pipe. An exhaust pipe is disposed on the acid gas filter box, and is configured to discharge the filtered gas from the acid gas filter box. A fan is connected to the gas-suction pipe, and can drive the acid steam in the cover body into the acid gas filter box.

Further, the laser processing mechanism comprises a laser, the laser is connected to a scanning galvanometer through an optical fiber, and the scanning galvanometer is fixedly connected to the top end of the cover body.

Further, the cover body comprises an upper bracket, a lower bracket and a flexible transparent cover, the upper bracket is fixedly connected to the scanning galvanometer, the lower bracket is fixedly connected to the working box, and the flexible transparent cover is connected between the upper bracket and the lower bracket.

Further, a vertical driving mechanism is connected to the scanning galvanometer, and the vertical driving mechanism can drive the scanning galvanometer along the vertical direction. A three-axis table is connected to the working box, and is able to drive to the working box along a first direction and a second direction perpendicular to each other on a horizontal plane, and to rotate in the vertical direction. The workpiece clamping mechanism is connected to a drive motor. The driving motor is fixed on a side wall of the working box, and can drive the rotation of the workpiece clamping mechanism.

The invention also discloses a working method of the processing device for film cooling holes on blade of aviation engine, and the working method includes the following steps.

Step 1: opening the cover body and fixedly connecting the workpiece to be machined to the workpiece clamping mechanism.

Step 2: using the liquid-supply mechanism to inject the acidic solution that does not react with the workpiece at room temperature into the working box, so that a liquid level of the acidic solution exceeds a set height of the workpiece to be processed.

Step 3: the liquid-supply mechanism sprays acidic solution to the workpiece at a pressure of 0.7 Mpa-0.9 Mpa to form a thin solution layer on a surface of the workpiece, then the laser processing mechanism carries out laser drilling on the workpiece.

Step 4: after drilling is finished, the liquid-supply mechanism sprays acidic solution to the workpiece at a pressure of 0.05 Mpa-0.15 Mpa, so that the workpiece is immersed in the acidic solution. A recast layer produced by laser processing is removed by a chemical reaction with the acidic solution in the drilling area heated by laser.

The present invention has the following beneficial effects.
1. The processing device of the present invention effectively improves the processing quality of workpiece by setting the liquid supply mechanism. Through the setting of the liquid supply mechanism, the workpiece in the working box can be sprayed with acidic solution, so that the workpiece is immersed in the acidic solution. The acidic solution in the drilling area heated by laser can has a high temperature chemical reaction with the recast layer produced by the processing of laser, so as to remove recast layer.
2. The processing device of the present invention saves resources. The working box is connected to the liquid storage box through the liquid-return pipeline to realize the reuse of acidic solution.
3. The processing device of the present invention is provided with an acid gas filtration mechanism, which can filter the acid steam produced during processing, prevent the acid steam from spreading to the external environment, and avoid the harm to the health of the experimental personnel and the pollution to the external environment.
4. The cover body in the processing device of the present invention has a flexible transparent cover, which not only facilitates the real-time observation during processing, but also realizes that the movement of the scanning galvanometer and the working box are not affected mutually, and meets the processing requirements of different positions of the workpiece.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Wherein, 1 working box, 1-1 partition board, 1-2 slot structure, 1-3 door, 1-4 liquid-return port, 2 cover body, 2-1 lower bracket, 2-2 upper bracket, 2-3 flexible transparent cover, 3 liquid supply mechanism, 3-1 liquid storage pool, 3-2 detachable liquid storage pool cover, 3-3 diaphragm pump, 3-4 pressure stabilizing tank, 3-5 liquid supply pipeline, 3-6 glass clamp, 3-7 nozzle, 3-8 liquid outlet, 4 acid gas filter mechanism, 4-1 acid gas filter pool, 4-2 acid gas filter pool cover, 4-3 gas-suction pipe, 4-4 fan, 4-5 L-shaped gas-suction pipe bracket, 4-6 exhaust pipe, 4-7 second outlet pipe, 5 laser processing mechanism, 5-1 scanning galvanometer, 5-2 optical fiber head, 5-3 optical fiber, 5-4 laser, 6 connecting shaft, 7 U-shaped connecting plate, 8 connecting part, 9 clamping part, 10 block, 11 end cover, 12 fixed nut, 13 coupling, 14 servo motor, 15 mechanical arm, 16 blade, 17 liquid-return connector, 18 liquid-return joint, 19 first outlet pipe, 20 control system, 21 high light transmittance glass.

DESCRIPTION OF THE EMBODIMENTS

It should be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms 'comprise' and/or 'include' used in this specification indicate that there are features, steps, operations, devices, components, and/or combinations thereof.

For convenience of description, the words 'above', 'below', 'left', and 'right' only indicate directions consistent with those of the accompanying drawings, are not intended to limit the structure, and are used only for ease and brevity of illustration and description, rather than indicating or implying that the mentioned device or element must have a particular orientation or must be constructed and operated in a particular orientation. Therefore, such terms should not be construed as a limitation on the present invention.

As described in the background, the recast layer is easy to be produced when the existing film cooling holes are processed by laser, which affects the processing quality. In view of the above problems, this application puts forward a processing device for film cooling holes on blade of aviation engine.

In embodiment 1 of a typical implementation of this application, as shown in FIGS. 1-15, a processing device for film cooling holes on blade of aviation engine comprises a working box 1, a cover body 2, a liquid supply mechanism 3, an acid gas filter mechanism 4, a laser processing mechanism 5 and a control system 20.

Figure 2:
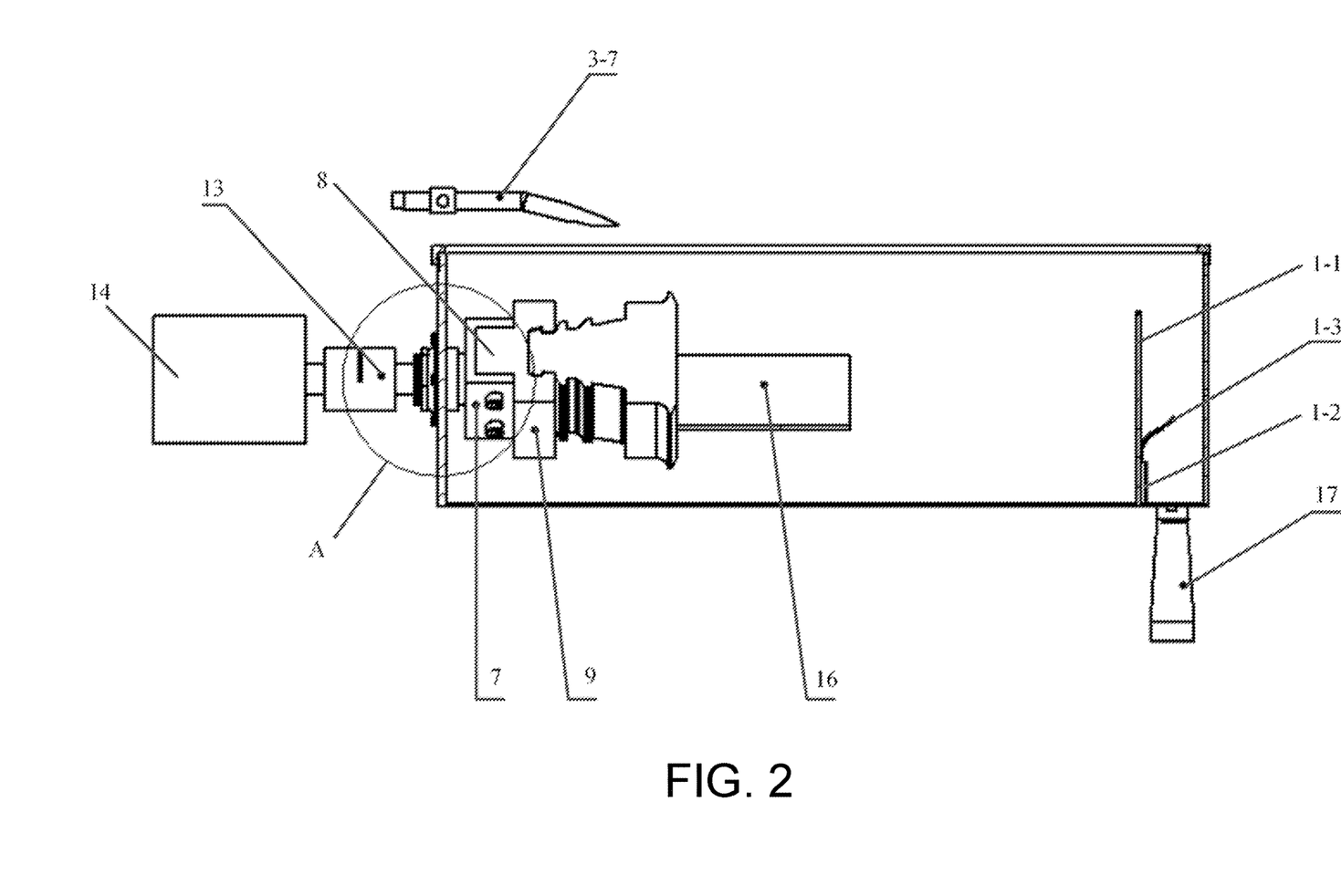
FIG. 2 is a schematic diagram of internal structure of a working box of Embodiment 1 of the present invention.
Figure 3:
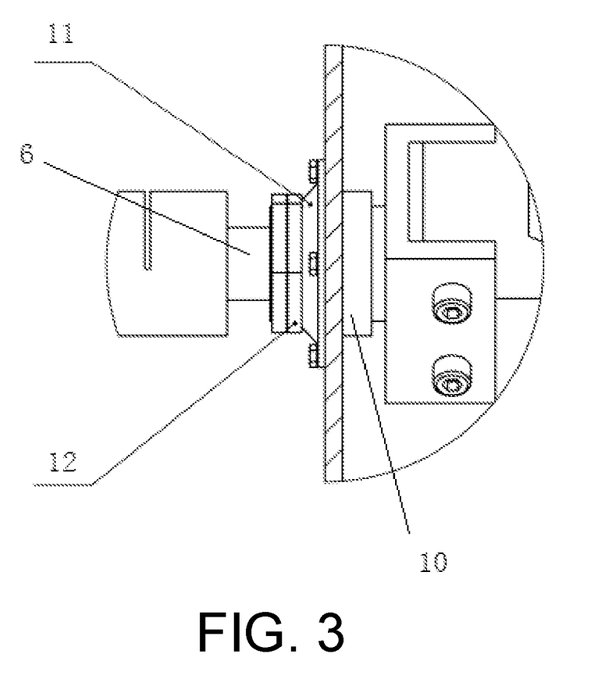
FIG. 3 is an enlarged view of region A in FIG. 2 of the present invention.
Figure 4:
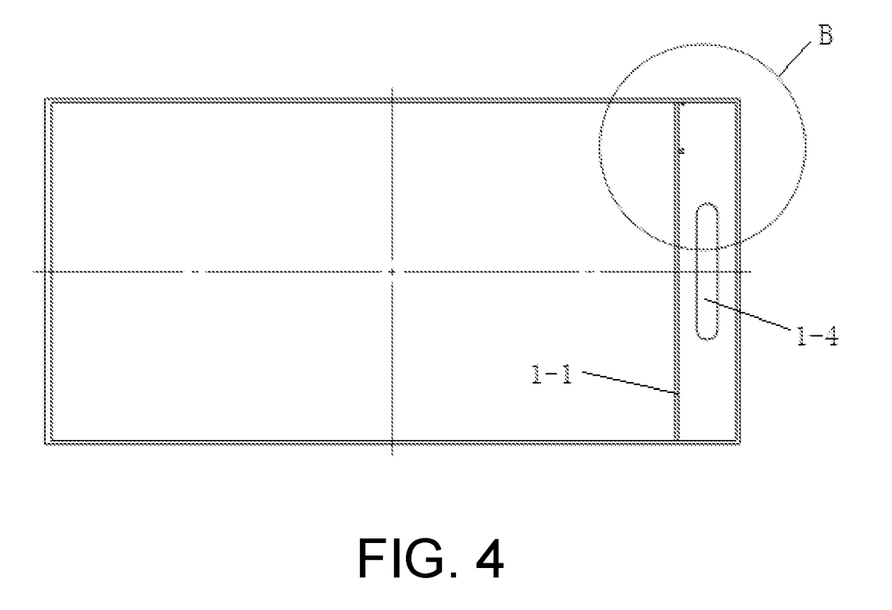
FIG. 4 is a top view of the working box of Embodiment 1 of the present invention.

The working box has an upside opening for exposure. A partition board 1-1 is fixed in the working box and divides the internal space of the working box into a liquid storage zone and a liquid discharge zone. The liquid storage zone is provided with the workpiece clamping mechanism for clamping workpiece. The opening is arranged on the partition board, and a slot structure 1-2 is arranged at the opening. The opening and closing of the opening can be controlled by inserting or pulling out a door 1-3 in the slot structure, and then the connection and closing of the liquid storage zone and the liquid discharge zone can be controlled.

The working box is fixed on a three-axis table. The three-axis table can drive the working box to move in the first and second directions perpendicular to each other in the horizontal plane, and can drive the working box to rotate in the vertical direction perpendicular to the plane where the first and second directions are located at. The three-axis table adopts the existing commonly used three-axis working table.

Figure 7:
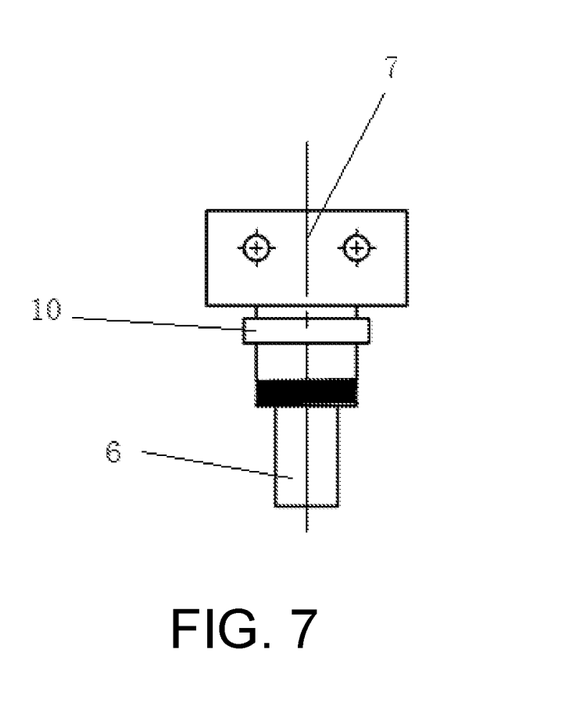
FIG. 7 is a main view of the assembly of a connecting shaft and a U-shaped connecting plate in Embodiment 1 of the present invention.
Figure 8:
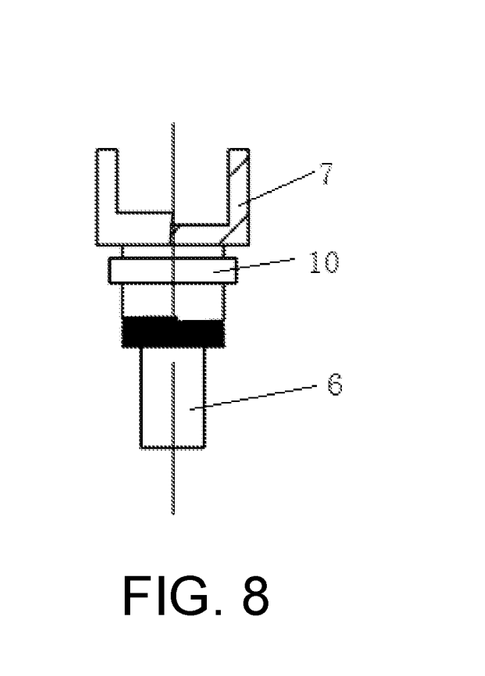
FIG. 8 is a side view of the assembly of the connecting shaft and the U-shaped connecting plate in Embodiment 1 of the present invention.

The workpiece clamping mechanism comprises a connecting shaft 6 which is fixedly connected to a U-shaped connecting plate 7 after passing through the side wall of the working box. The U-shaped connecting plate is connected to the clamping head through a bolt. The clamping head comprises a connecting part 8 and a clamping part 9. The connecting part is fixedly connected with the U-shaped connecting plate through a bolt. The shape of the clamping part matches the shape of the end of the blade to be machined, and can clamp the blade to be machined. In actual processing, a series of clamping head can be processed using the same connection part, the clamping part can be set according to the specific specifications of the fan blade, so that only need to change the different clamping head can be achieved using the same set of connecting shaft and U-type connecting plate hold various specifications of the blade.

Figure 6:
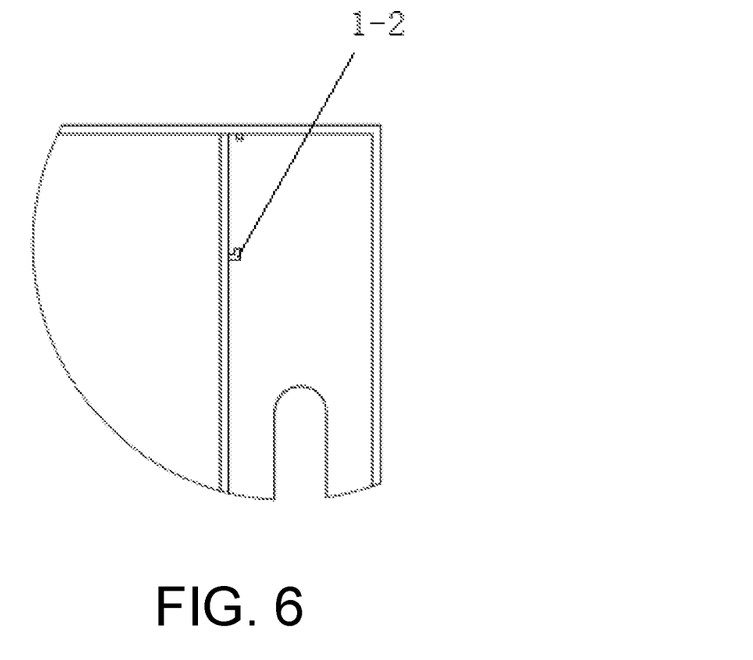
FIG. 6 is an enlarged view of region B in FIG. 4 of the present invention.

A block 10 and an end cover 11 are arranged on the shaft segment of connecting shaft respectively on both sides of the side wall of the working box, and the block 10 and the end cover 11 are used for limiting the position of the connecting shafts on the working box, to prevent the connecting shafts from moving along its axial direction. The end cover is fixedly connected to the side wall of the working box through bolts, and the sealing ring is arranged between the end cover and the side wall of the working box to prevent solution leakage in the working box. One side of the end cover is tightened with two fixed nuts 12, the fixed nut close to the end cover is pressed on the side wall of the working box to limit the end cover, and the other one plays a role in preventing loose.

Figure 5:
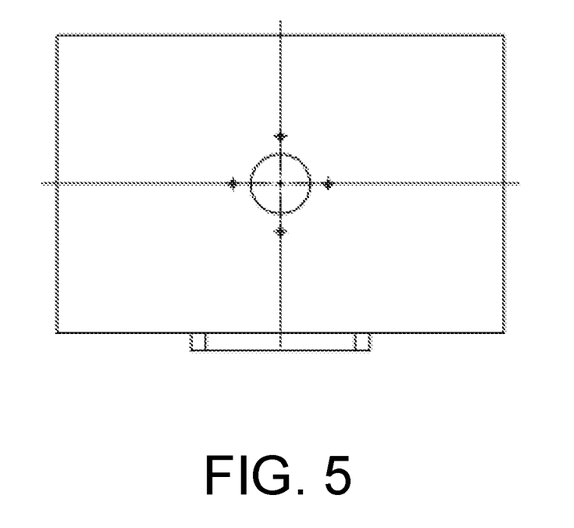
FIG. 5 is a side view of the working box of Embodiment 1 of the present invention.

The connecting shaft is connected with the output shaft of a servo motor 14 through a coupling 13. The servo motor can drive the rotation of the workpiece clamping mechanism.

Figure 1:
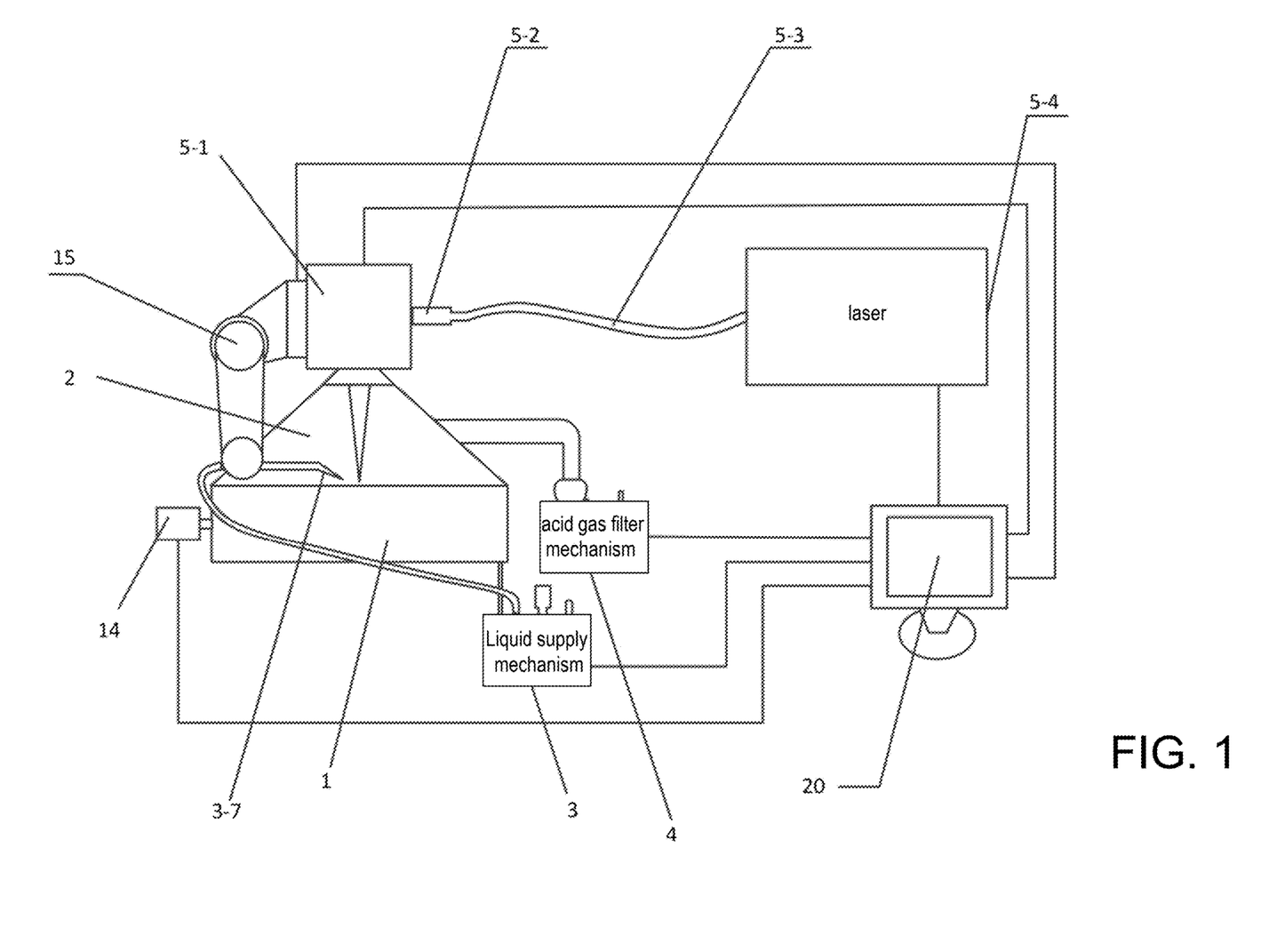
FIG. 1 is a schematic diagram of overall structure of Embodiment 1 of the present invention.
Figure 9:
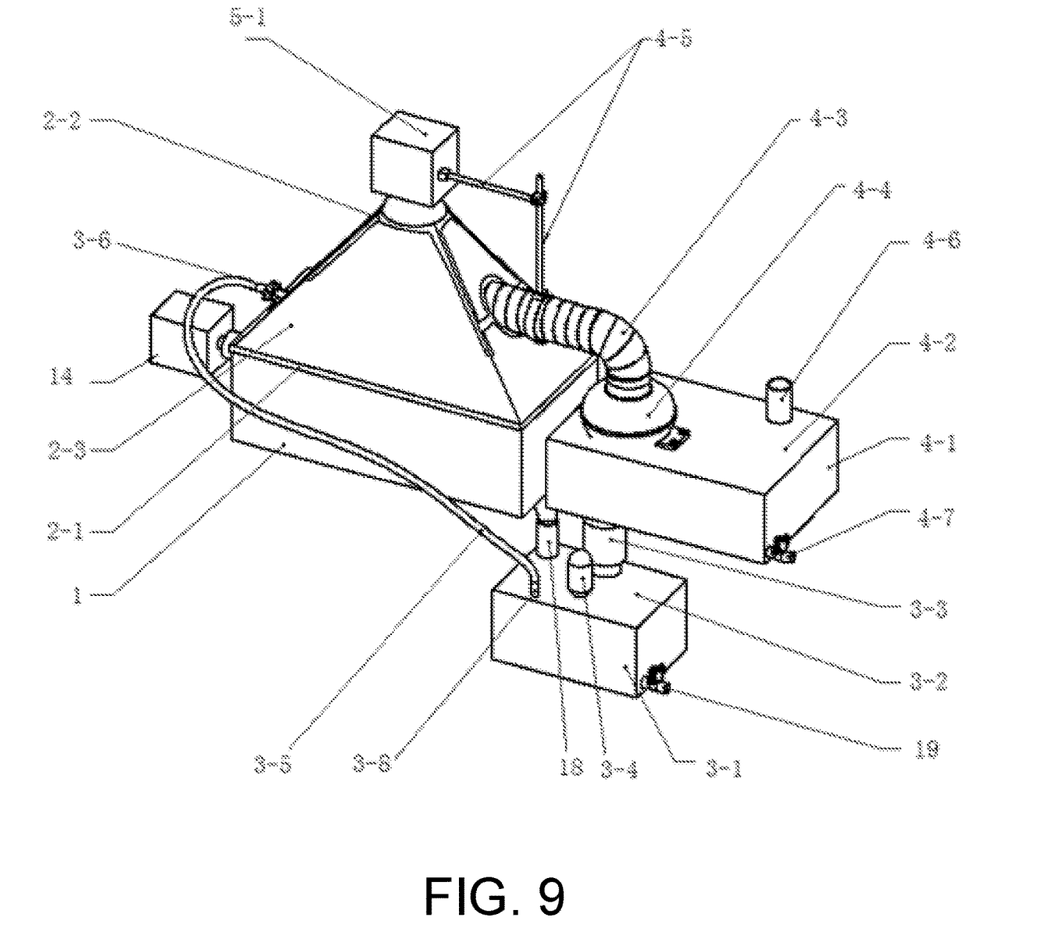
FIG. 9 is an assembly schematic diagram of the working box, a liquid supply mechanism, an acid gas filter mechanism, a cover body and a laser processing mechanism in Embodiment 1 of the present invention.

The cover body is a cone platform structure, connected to the upper part of the working box, and the internal space of the cover body is communicated with the internal space of the working box. The cover body comprises a lower bracket 2-1, an upper bracket 2-2 and a flexible transparent cover 2-3 fixed between the upper bracket and the lower bracket. The lower bracket is detachably connected to the upper part of the working box, and the upper bracket is connected to the laser processing mechanism.

The laser processing mechanism includes a scanning galvanometer 5-1. A lens of the scanning galvanometer 5-1 is fixedly connected to the upper bracket. The scanning galvanometer is connected to a laser 5-4 through an optical fiber head 5-2 and an optical fiber 5-3. The laser is a rubidium ytterbium garnet pulsed fiber laser with a wavelength of 1064 nm. The optical fibers can be derived from the laser generated by the pulse laser. The optical fiber head performs beam expansion, collimation and other shaping operations on the laser beam derived from the optical fiber and then input the laser beam into the scanning galvanometer. The scanning galvanometer can control the laser through the control system to obtain the required processing path and carry out laser drilling for the workpiece.

The optical fiber head can use the existing optical fiber head, as long as the laser beam expansion, collimation and other functional requirements can be met.

A vertical driving mechanism is connected to the scanning galvanometer, and the vertical driving mechanism can drive the lifting movement of the scanning galvanometer to move along the vertical direction. The vertical driving mechanism can use existing mechanisms, such as vertical screw driver mechanism, so its specific structure is not described in detail here.

Because the cover body adopts flexible transparent cover, the vertical driving mechanism and the work of the three-axis table do not affect each other, and it is convenient to observe the processing process.

The cover is connected to a liquid feeding mechanism 3. The liquid feeding mechanism includes a liquid storage box for holding acidic solution, the acidic solution in the liquid storage box is required not to occur chemical reaction with the workpiece at room temperature (15° C.-30° C.), and can react with the recasting layer produced by laser processing of the workpiece after heating to a certain temperature. The liquid storage box is connected to the cover body by a liquid-supply pipeline made of silica gel material. The acidic solution in the liquid storage box can enter the working box through the liquid-supply pipeline. The liquid storage box comprises a liquid storage pool 3-1. The liquid storage pool is connected to a detachable liquid storage pool cover 3-2. The liquid storage pool cover is installed with a driving pump and a pressure stabilizing tank 3-4 connected to the liquid-supply pipeline, and is provided with a liquid outlet 3-8 connected to the liquid-supply pipeline and the liquid storage box. The drive pump can use diaphragm pump 3-3, and can drive the acidic solution in the liquid storage pool into the working box. The surge tank can buffer the pulsation effect of diaphragm pump, so that the liquid-supply pipeline can output acidic solution stably.

The end of a liquid supply pipeline 3-5 extends into the cover body is connected to a nozzle 3-7 through a glass clamp 3-6. The nozzle is used to spray the acidic solution at set pressure to the workpiece. The angle between the nozzle and the horizontal plane is 15°, so that the eject solution can be better concentrated in the processing area.

The glass clamp is connected to the mechanical arm 15. The mechanical arm is fixedly connected to the scanning galvanometer. The mechanical arm can control the position of the nozzle, so that the nozzle position can meet the processing needs; correspondingly, the flexible transparent cover is provided with an opening for the nozzle to pass through and adjust the position.

Figure 12:
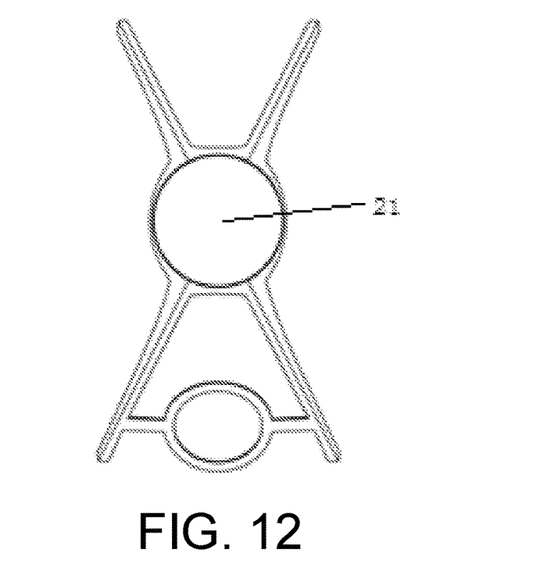
FIG. 12 is a top view of an upper bracket of Embodiment 1 of the present invention.
Figure 13:
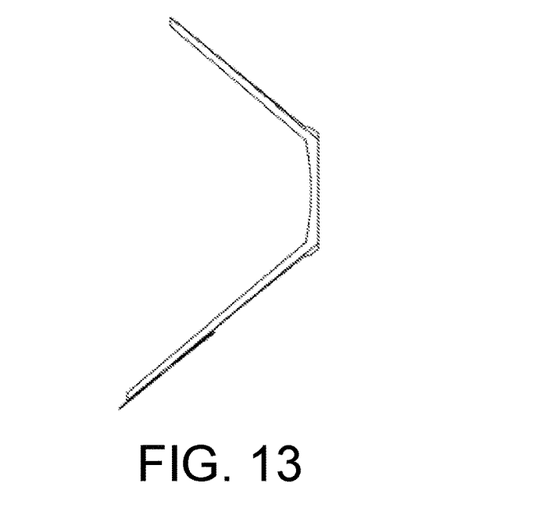
FIG. 13 is a side view of the upper bracket of Embodiment 1 of the present invention.
Figure 14:
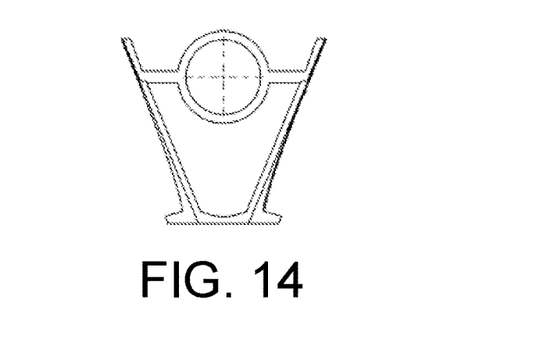
FIG. 14 is a main view of the upper bracket of Embodiment 1 of the present invention.

The top of the upper bracket is provided with a high light transmittance glass 21. The high light transmitting glass is fixedly connected to the upper bracket through the groove at the top of the upper bracket, which plays a sealing role in the processing environment, prevents the corrosive acidic solution from sputtering to the field lens of the scanning galvanometer, and retains the acid steam generated by heating in the processing process in the internal area of the flexible transparent cover, can effectively prevent acidic solution from contaminating the lens of scanning galvanometer during processing.

Figure 10:
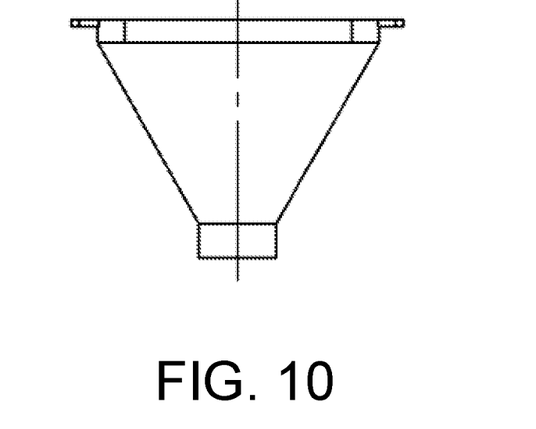
FIG. 10 is a main view of a liquid-return joint of Embodiment 1 of the present invention.
Figure 11:
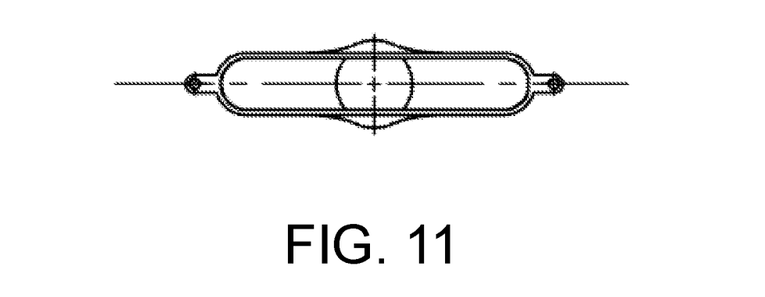
FIG. 11 is a top view of the liquid-return joint of Embodiment 1 of the present invention.

A liquid-return pipeline is also connected between the liquid discharge zone of the working box and the liquid storage box. The liquid-return pipeline comprises a liquid-return connector 17 fixedly connected to the bottom wall of the working box. The liquid-return connector is of inverted conical structure, and is communicated with the internal space of the liquid discharge zone through a liquid-return port 1-4 arranged in the working box. The liquid-return joint is connected to the liquid storage box through the liquid-return pipe made of silica gel material and a liquid-return joint 18 arranged on the liquid storage pool cover. The acidic solution in the liquid discharge zone can flow through the liquid-return connector and the liquid-return pipe into the liquid storage box, realizing the recycling of acidic solution.

The bottom of the side wall of the liquid storage pool is provided with the first outlet pipe 19. The first outlet pipe is provided with a first outlet valve. The first outlet pipe is used to discharge the acidic solution from the liquid storage pool.

The cover is also connected to an acid gas filtration mechanism. The acid gas filtration mechanism comprises an acid gas filter box for containing a weak alkaline solution. The acid gas filter box comprises an acid gas filter pool 4-1 and an acid gas filter pool cover 4-2 that can be disassembled and connected to each other. One end of a gas-suction pipe 4-3 is connected to the acid gas filter pool cover, and the other end of a gas-suction pipe 4-3 is extended into the cover body. The gas-suction pipe is connected to a fan 4-4. The fan is fixedly connected to the acid gas filter pool cover. The fan adopts a turbine blade, which can generate enough negative pressure to absorb the acid steam inside the cover body and make the acid steam enter the inside of the acid gas filter pool.

The gas-suction pipe is connected to the scanning galvanometer through an L-shaped gas-suction pipe bracket 4-5, which can realize the follow-up of the suction pipe and the scanning galvanometer.

The acid gas filter pool cover is provided with an exhaust pipe 4-6 for discharging the filtered gas in the acid gas filter pool. The bottom of the side wall of the acid gas filter pool is provided with a second outlet pipe 4-7. The second outlet pipe is provided with a second outlet valve. The second outlet pipe is used to discharge the liquid from the acid gas filter pool.

In this embodiment, the liquid-supply pipeline and the gas-suction pipe extend into the interior of the cover body through the opposite sides of the cover body.

In this embodiment, the diaphragm pump, fan, laser processing mechanism, servo motor, three-axis table and vertical driving mechanism are connected with and controlled by the control system.

Embodiment 2

This embodiment discloses a working method of the processing device for film cooling holes on blade of the aviation engine, including the following steps.

Step 1: opening the cover and fix the blade 16 of the aviation engine to be machined on the clamping head.

Step 2: putting the cover body on the working box; inputting the blade material needed to process the film cooling holes and the array program of the film cooling holes into the control system. The control system obtains the laser processing parameters in the system library through the processing material, and generates the laser processing path through the array program. Controlling the vertical driving mechanism to adjust the scanning galvanometer to the appropriate position; controlling the servo motor and the three-axis table to adjust the blade position to the required processing position; controlling the mechanical arm to adjust the nozzle to the appropriate position. The diaphragm pump works, and injects acidic solution into the liquid storage zone. The liquid level exceeds the blade to be processed from above to 2 mm. The acidic solution can use 3 mol/L hydrochloric acid saturated solution or 4 mol/L sodium nitrate saturated solution, which will not react with the blade at room temperature.

Figure 15:
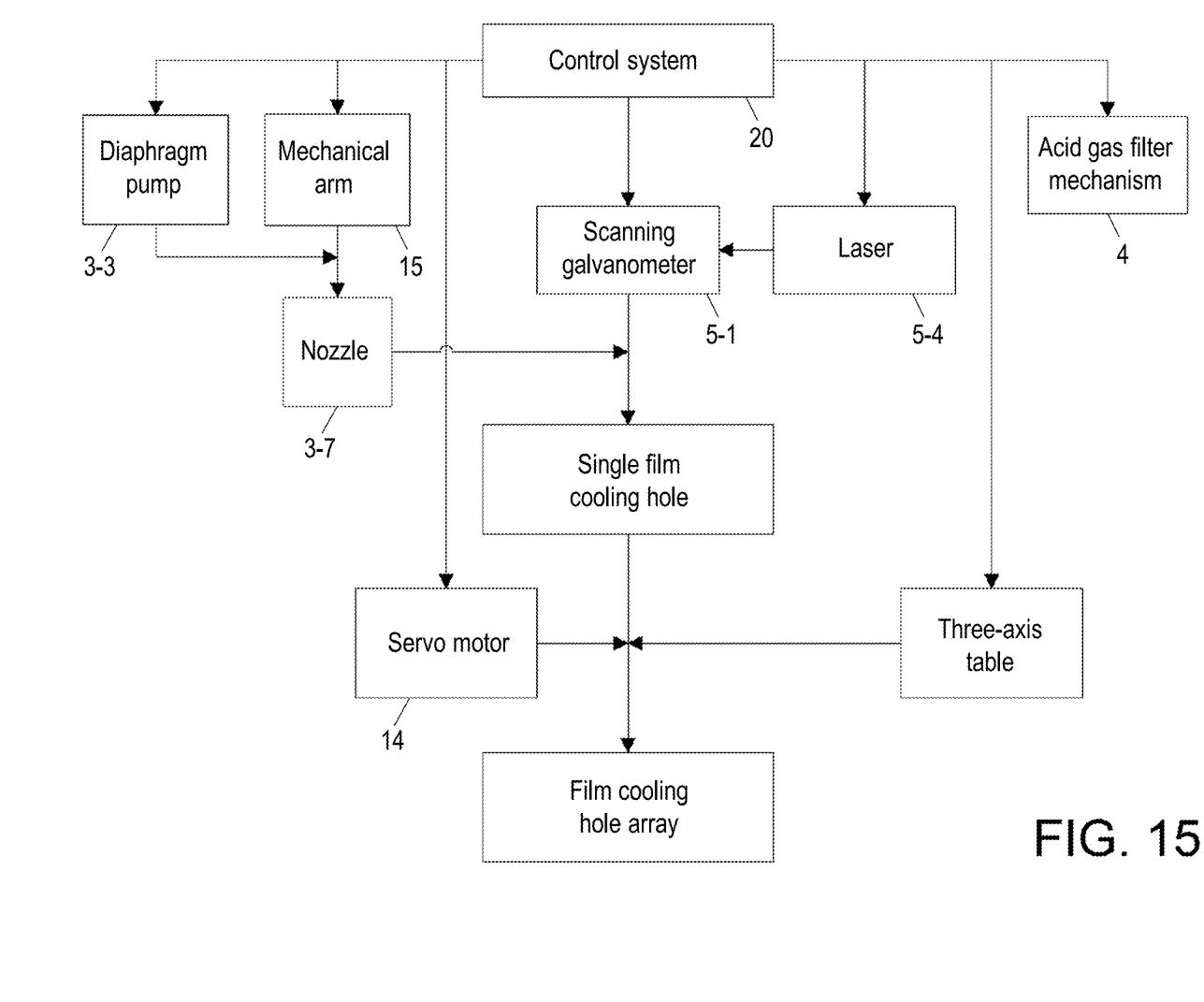
FIG. 15 is a schematic diagram of the working principle of Embodiment 1 of the present invention.

Step 3: the control system controls the diaphragm pump to work. The nozzle sprays 0.8 Mpa acidic solution to the workpiece to form a high-speed jet, and a thin solution layer of about 0.2 mm thickness is formed on the surface of the workpiece. The laser works, and the laser ray produced is injected through the scanning galvanometer to drill the blade.

Step 4: after drilling is completed, adjust the defocus amount of the scanning galvanometer and increase the laser frequency according to the program setting, so that the heating solution effect is more uniform. The diaphragm pump sprayed the acidic solution into the workpiece at a pressure of 0.1 Mpa. Because the injection pressure was small, the workpiece was immersed in the acidic solution, and the surface of the processing area was able to form a solution layer of 3-4 mm thick. As the thickness of the solution layer above the workpiece increases, the absorption degree of the solution to the laser becomes greater, and the temperature of the acidic solution in the area of the hole processed in the Step 3 increases, the acidic solution reacts with the recast layer formed by laser processing, and the recast layer is removed. In the recast layer removal process, the nozzle continues to spray an acidic solution at a low pressure into the workpiece, can make the solution of liquidity. On one hand, it can prevent the solution from boiling due to overheating, which can influence the processing effect, and on the other hand, it can take away the high-temperature acidic solution that spills out from the holes in time and prevent the corrosion of the matrix near the hole.

During processing, the solution added into the processing area can timely overflow from the liquid storage zone of the working box through the top of the partition board, and flow back to the liquid storage box from the liquid return port to realize the recycling of acidic solution.

During processing, the generated acid steam can enter the acid gas filter pool through the gas-suction pipe under the action of the fan, and is neutralized by a weakly alkaline solution contained in the acid gas filter pool to achieve the effect of filtration. The filtered gas is exhausted by the exhaust pipe. The weak alkaline solution can be used 15% of the calcium hydroxide solution, and also can use other weak alkaline solution, meet the demand of neutralization reaction.

The control system controls the work of three-axis table, servo motor, mechanical arm and vertical driving mechanism, and adjusts the position of the workpiece. Through the Step 3 to the Step 4, the film cooling holes in different parts of the blade are processed. After the processing of the blade is completed, open the cover body and then remove the door, the remaining solution in the liquid storage zone of the working box enters the liquid storage box through the liquid-return pipeline; remove and clean the blade to complete the processing of the film cooling holes of the blade.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A processing device for film cooling holes on blade of aviation engine, the processing device comprising:
    a working box, wherein a workpiece clamping mechanism for clamping a workpiece is disposed in the working box, a cover body having an internal space in communication with an internal space of the working box is connected to an upper part of the working box, a laser processing mechanism is connected to a top end of the cover body and is able to produce laser rays to carry out laser processing on the workpiece in the working box, the cover body is connected to a liquid supply mechanism and an acid gas filter mechanism, the liquid supply mechanism is configured to spray an acidic solution to the workpiece in the working box, the acid gas filter mechanism is configured to filter acid steam produced during processing, and the acidic solution is collected by the working box; and the acidic solution does not react with the workpiece at room temperature.

2. The processing device of claim 1, wherein the liquid supply mechanism comprises a liquid storage box, for holding the acidic solution, the liquid storage box is connected to the cover body through a liquid-supply pipeline, a nozzle extended into an interior of the cover body is connected to an end of the liquid-supply pipeline, and a drive pump is connected to the liquid-supply pipeline and is configured to drive the acidic solution in the liquid storage box to enter the working box.

3. The processing device of claim 2, wherein a mechanical arm clamps the nozzle, and the mechanical arm is used to adjust a position of the nozzle.

4. The processing device of claim 2, wherein a pressure stabilizing tank is connected to the liquid-supply pipeline and is configured to maintain an output pressure of the acidic solution.

5. The processing device of claim 2, wherein a partition board is disposed in the working box and is configured to divide the internal space of the working box into a liquid storage zone and a liquid discharge zone, the workpiece clamping mechanism is located inside the liquid storage zone; an opening is disposed on the partition board, a door configured to control communication and closure of the liquid storage zone and the liquid discharge zone is disposed on the opening; the liquid discharge zone is connected to the liquid storage box through a liquid-return pipeline; the acidic solution in the liquid discharge zone is able to enter the liquid storage box through the liquid-return pipeline.

6. The processing device of claim 1, wherein the acid gas filtration mechanism comprises an acid gas filter box configured to hold an alkaline solution; an end of a gas-suction pipe is connected to the acid gas filter box, and another end of the gas-suction pipe is connected to the cover body, the acidic steam inside the cover body is able to enter the acid gas filter box through the gas-suction pipe; an exhaust pipe is disposed on the acid gas filter box and is configured to discharge a filtered gas from the acid gas filter box, and a fan is connected to the gas-suction pipe and is configured to drive the acidic steam inside the cover body into the acid gas filter box.

7. The processing device of claim 1, wherein the laser processing mechanism comprises a laser, the laser is connected to a scanning galvanometer through an optical fiber, and the scanning galvanometer is fixedly disposed on the top end of the cover body.

8. The processing device of claim 7, wherein the cover body comprises an upper bracket fixedly connected to the scanning galvanometer, a lower bracket fixedly connected to the working box, and a flexible transparent cover connected between the upper bracket and the lower bracket.

9. The processing device of claim 8, wherein a vertical driving mechanism is connected to the scanning galvanometer and is configured to drive the scanning galvanometer to move in a vertical direction; a three-axis table is connected to the working box, and is configured to drive the working box to move in a first direction and a second direction perpendicular to each other on a horizontal plane and to rotate in the vertical direction, the workpiece clamping mechanism is connected to a drive motor, and the drive motor is fixed on a side wall of the working box and is configured to drive the workpiece clamping mechanism to rotate.

* * * * *